United States Patent
Fujii et al.

[11] Patent Number: 5,916,474
[45] Date of Patent: Jun. 29, 1999

[54] LUBRICANTS FOR AND METHODS OF PROCESSING SYNTHETIC FIBERS

[75] Inventors: Tsukasa Fujii; Yukio Komatsu; Yasushi Maeshima, all of Aichi, Japan

[73] Assignee: Takemoto Yushi Kabushiki Kaisha, Aichi, Japan

[21] Appl. No.: 09/012,266

[22] Filed: Jan. 23, 1998

[51] Int. Cl.$^6$ .................... D06M 15/53; D06M 15/507; D01D 5/00
[52] U.S. Cl. ........................... 252/8.81; 252/8.84
[58] Field of Search ................... 252/8.81, 8.84; 427/389.9

[56] References Cited

U.S. PATENT DOCUMENTS 4,130,603  12/1978  Tanaka et al. ................. 428/195
5,269,950  12/1993  Iwamoto et al. ................ 252/8.84

OTHER PUBLICATIONS

Chemical Abstract No. 93:48470, abstract of Japanese Patent Specification No. 55–030413, Mar. 1980.
Chemical Abstract No. 103:197234, abstract of German Patent Specification No. 221772, May 1985.
Chemical Abstract No. 115:138127, abstract of Japanese Patent Specification No. 03–040867, Feb. 1991.
Chemical Abstract No. 115:138162, abstract of Japanese Patent Specification No. 03–040873, Feb. 1991.

*Primary Examiner*—Anthony Green
*Attorney, Agent, or Firm*—Majestic, Parsons, Siebert & Hsue P.C.

[57] ABSTRACT

Synthetic fibers are processed under a specified condition by applying a lubricant containing a polyether polyester nitrogenous compound with numerically averaged molecular weight 500–20000 obtained by ring-opening polymerization of hydroxyl group of fatty alkanol nitrogenous compound of a specified kind with alkylene oxide with 2–4 carbon atoms to form polyalkoxylated block and ring-opening polymerization of end hydroxyl group of this polyalkoxylated block with ε-caprolactone to form polycarbonylpentoxy block. An acylated polyether polyester nitrogenous compound obtainable by acylating such polyether polyester nitrogenous compound with an acylation reagent of a specified kind may also be used as the lubricant. The lubricant may further contain aliphatic ester of a specified kind at a specified ratio.

12 Claims, No Drawings

LUBRICANTS FOR AND METHODS OF PROCESSING SYNTHETIC FIBERS

BACKGROUND OF THE INVENTION

This invention relates to lubricants for and methods of processing synthetic fibers During the spinning process of synthetic fibers such as polyamide and polyester fibers, it is important to prevent generation of fuzz and occurrence of yarn breakages. Since synthetic fibers for industrial materials such as tire cords, seat belts and air bags are produced under severe conditions of high temperature and high contact pressure and are likely to generate fuzz and yarn breakages, it is particularly important with such fibers to prevent generation of fuzz and occurrence of yarn breakages. Agents for lubricating such synthetic fibers (herein referred to simply as the lubricants) are therefore required to be capable of providing sufficient lubricity even to such synthetic fibers adapted to undergo a spinning process under a condition of high temperature and high contact pressure. This invention relates to lubricating agents which can respond to such a demand and also to methods of processing synthetic fibers.

Examples of prior art lubricant proposed for providing lubricity even to synthetic fibers adapted to undergo a spinning process under a severe condition of high temperature and high contact pressure include (1) polyester obtained from polyhydroxy compound and dibasic acid having its end closed with aliphatic alcohol, its alkylene oxide adduct or aliphatic carboxylic acid (Japanese Patent Publications Tokkai 3-871 and 5-339875), (2) polyoxyalkyleneglycol with numerically averaged molecular weight greater than 1000 (Japanese Patent Publication Tokkai 6-158538), (3) nitrogenous compounds of numerically averaged molecular weight 1000–20000 obtained by adding alkylene oxide to aliphatic amine (Japanese Patent Publication Tokkai 6-228885), (4) metallic salt of phosphoro-dithioate such as zinc di(di n-butyl phosphoro-dithioate) (U.S. Pat. No. 5,269, 950), and (5) silane compound containing mercapto group such as γ-mercaptopropyl trimethoxy silane (U.S. Pat. No. 5,269,950). These prior art lubricants cannot provide a high level of lubricity to synthetic fibers, however, and lubricity can be provided only to a very unsatisfactory level in the case of synthetic fibers as industrial materials adapted to be processed under a condition of high temperature and high contact pressure. Thus, the generation of fuzz and occurrence of yarn breakage could not be adequately prevented by prior art lubricants.

SUMMARY OF THE INVENTION

The problem to be overcome by the present invention is that prior art lubricants cannot provide lubricity to synthetic fibers to a sufficiently high degree and in particular in the case of industrial synthetic fibers adapted to be processed under conditions of high temperature and high contact pressure such that generation of fuzz and occurrence of yarn breakage could not be effectively prevented.

This invention is based on the discovery by the present inventors that polyether polyester nitrogenous compounds of a specified structure obtained by forming specified polyether blocks and specified polyester blocks in a specified order in a specified kind of fatty alkanol (hydroxyalkyl) nitrogenous compound are effective lubricants.

DETAILED DESCRIPTION OF THE INVENTION

This invention relates firstly to a lubricant comprising a polyether polyester nitrogenous compound of numerically averaged molecular weight 500–20000 obtained by carrying out ring-opening polymerization of hydroxyl group of fatty alkanol nitrogenous compound of a specified kind with alkylene oxide with 2–4 carbon atoms to form polyalkoxylated block and then carrying out ring-opening polymerization of end hydroxyl group of this polyalkoxylated block with ε-caprolactam to form polycarbonylpentoxy block, and characterized wherein this polyalkoxylated block has 4–100 alkoxy units per hydroxyl group of the fatty alkanol nitrogenous compound, wherein the number of the alkoxy units of this polyalkoxylated block and the number of carbonyl pentoxy units of the polycarbonylpentoxy block are at a ratio of 1/1–6/1, and wherein aforementioned fatty alkanol nitrogenous compound of the specified kind is one or more selected from dialkyl monoalkanolamine having alkyl group with 8–24 carbon atoms, alkyl dialkanolamine having alkyl group with 8–24 carbon atoms, fatty acidic alkanolamide of fatty acid with 8–24 carbon atoms, fatty acidic dialkanolamide of fatty acid with 8–24 carbon atoms, hydroxy fatty acidic monoalkanolamide of hydroxy fatty acid with 6–24 carbon atoms and hydroxy fatty acidic dialkanolamide of hydroxy fatty acid with 6–24 carbon atoms. This invention relates secondly to lubricants comprising acylated polyether polyester nitrogenous compound obtained by reacting an acylation reagent with 2–22 carbons atoms with terminal hydroxyl group of such polyether polyester nitrogenous compound. This invention relates thirdly to lubricants formed by mixing such nitrogenous compounds with a specified kind of fatty acid ester at a specified ratio and fourthly to methods of processing synthetic fibers by applying such lubricants as described above to the synthetic fibers under a specified condition.

In summary, the polyether polyester nitrogenous compound of this invention is obtained by ring-opening polymerization of hydroxyl group of fatty alkanol nitrogenous compound of a specified kind with alkylene oxide to form polyalkoxylated block and another ring-opening polymerization of end hydroxyl group of this polyalkoxylated block with ε-caprolactone to form polycarbonylpentoxy block. Examples of fatty alkanol nitrogenous compound, thus used, include (1) dialkyl monoalkanolamines having alkyl group with 8–24 carbon atoms such as dilauryl monoethanolamine dilauryl monopropanolaminee stearyl octyl monoethanolamine, distearyl monoethanolamine and dioleyl monoethanolamine; (2) alkyl dialkanolamines having alkyl group with 8–24 carbon atoms such as lauryl diethanolamine, lauryl dipropanolamine, stearyl diethanolamine, stearyl dipropanolamine and oleyl diethanolamine; (3) aliphatic monoalkanolamides of aliphatic acid with 8–24 carbon atoms such as lauric monoethanolamide, lauric monopropanolamide, stearic monoethanolamide, stearic monopropanolamide and oleic monoethanolamide; (4) aliphatic dialkanolamides of aliphatic acid with 8–24 carbon atoms such as lauric diethanolamide, lauric dipropanolamide, stearic diethanolamide, and oleic diethanolamide; (5) hydroxyaliphatic monoalkanolamides of hydroxy aliphatic acid with 6–24 carbon atoms such as 12-hydroxystearic monoethanolamide, 12-hydroxystearic monopropanolamide, and ricinoleic monoethanolamide; and (6) hydroxyaliphatic dialkanolamides of hydroxy aliphatic acid with 6–24 carbon atoms such as 12-hydroxystearic diethanolamide, 12-hydroxystearic dipropanolamide and ricinoleic diethanolamide. Particularly preferable among them are aliphatic monoalkanolamides of hydroxyaliphatic acid with 16–22 carbon atoms and hydroxyaliphatic monoalkanolamides of hydroxyaliphatic acid with 16–22 carbon atoms.

Examples of alkoxy unit for forming polycarbonylpentoxy block of polyether polyester nitrogenous compound according to this invention include ethoxy unit, propoxy unit butoxy unit and alkoxy units with 2–4 carbon atoms obtained by mixing these units, but those having ethoxy units by 50 molar % or more as the alkoxy units are preferred and those formed only with ethoxy units are even more preferred.

The number of such alkoxy units forming the polyalkoxylated block of polyether polyester nitrogenous compound is 4–100 per hydroxyl group of the aforementioned fatty alkanol nitrogenous compound but it is more preferably 8–50.

Because the polyether polyester nitrogenous compound of this invention is formed by ring-opening polymerization of the hydroxyl group of fatty alkanol nitrogenous compound with alkylene oxide with 2–4 carbon atoms to form polyalkoxylated block and ring-opening polymerization of end hydroxyl group of this polyalkoxylated block with ε-caprolactone to form polycarbonylpentoxy block this polycarbonylpentoxy block contains a repetition of carbonylpentoxy units. The number of these carbonylpentoxy units should be such that (the number of alkoxy units forming the polyalkoxylated block)/(the number of carbonylpentoxy units forming the polycarbonylpentoxy block)=1/1–6/1, and more preferably 2/1–4/1.

This invention does not impose any particular requirement as to the method of forming a polyalkoxylated block on the hydroxyl group of a fatty alkanol nitrogenous compound or that of forming a polycarbonylpentoxy block on the terminal hydroxyl group of this polyalkoxylated block. Examples of prior art method for this purpose include the following: (1) In the case of a fatty alkanol nitrogenous compound having one hydroxyl group in the molecule, such as aliphatic monoalkanolamides or dialkyl monoalkanolamines, alkylene oxide with 2–4 carbon atoms such as ethylene oxide, propylene oxide and butylene oxide is used in the presence of a basic catalyst such as sodium hydroxide or potassium hydroxide for successive polymerization to form one polyalkoxylated block and ε-caprolactone is used next for successive ring-opening polymerization of the end hydroxyl group of this one polyalkoxylated block in the presence of an anionic polymerization catalyst, an orientation anionic polymerization catalyst or a cat ionic polymerization catalyst to form one polycarbonylpentoxy block to thereby obtain a polyether polyester nitrogenous compound with one polyether polyester block in the molecule; (2) In the case of a fatty alkanol nitrogenous compound having two hydroxyl groups in the molecule, such as aliphatic dialkanolamides or alkyl dialkanolaminese alkylene oxide with 2–4 carbon atoms are used as in (1) for successive ring-opening polymerization to obtain two polyalkoxylated blocks and next ε-caprolactone is used as in (1) for ring-opening polymerization of each end hydroxyl group of these two polyalkoxylated blocks to obtain a polyether polyester nitrogenous compound with two polyether polyester blocks in the molecule; and (3) In the case of a fatty alkanol nitrogenous compound having three hydroxyl groups in the molecule, such as hydroxyaliphatic dialkanolamides, alkylene oxide with 2–4 carbon atoms are used as in (1) for successive ring-opening polymerization to obtain two polyalkoxylated blocks and ε-caprolactone is used next as in (1) for ring-opening polymerization of each end hydroxyl group of these three polyalkoxylated blocks to obtain a polyether polyester nitrogenous compound with three polyether polyester blocks in the molecule. The numerically averaged molecular weight of such a polyether polyester nitrogenous compound is preferably 500–20000 and more preferably 1000–10000.

The polyether polyester nitrogenous compounds described above may be directly used as a lubricant but acylated polyether polyester nitrogenous compounds, obtained therefrom by causing an acylation reagent to react with the end hydroxyl group of their polycarbonylpentoxy block, can also be used as a lubricant. Examples of such acylated polyether polyester nitrogenous compound include (1) complete acylates obtained by acylating all end hydroxyl groups of the polycarbonylpentoxy block of polyether polyester nitrogenous compound by means of an acylation reagent, and (2) partial acylates obtained by acylating only a part of the end hydroxyl groups of the polycarbonylpentoxy block of polyether polyester nitrogenous compound by means of an acylation reagent. Acylation reagents with 2–22 carbon atoms are used such that examples of acyl groups which are formed by such an acylation reagent include (1) alkanoyl groups with 8–22 carbon atoms such as acetyl group, hexanoyl group, octanoyl group, hexadecanoyl group and octadecanoyl group, and (2) alkenoyl groups with 16–22 carbon atoms such as hexadecenoyl group, eicosenoyl group and octadecenoyl group.

For the acylation of end hydroxyl groups of polycarbonylpentoxy blocks of a polyether polyester nitrogenous compound, the prior art method of reacting acyl halide in the presence of a base may be used.

Although the polyether polyester nitrogenous compounds and the acylated polyether polyester nitrogenous compounds described above can be used directly as a lubricant, a specified kind of aliphatic ester may also be used in combination therewith. Examples of such aliphatic ester which may be used together with the polyether polyester nitrogenous compounds and the acylated polyether polyester nitrogenous compounds as a lubricant include one or more selected from esters derived from oleic acid and esters derived from oleyl alcohol. As an example of such ester derived from oleic acid, isopentacosyl oleate and 1,6-hexanediol dioleate are preferred. As an example of such ester derived from oleyl alcohol, dioleyl adipate is preferred. When such an ester derived from aliphatic acid is used, the weight ratio (ester derived from aliphatic acid)/(polyether polyester nitrogenous compound or acylated polyether polyester nitrogenous compound) is 50/50–95/5.

When a lubricant according to this invention is applied to synthetic fibers, it is heated to 40–80° C. to make it into a uniform liquid and applied in the neat condition at a ratio of 0.1–3.0 weight % with respect to the synthetic fibers between the spinning process and the drawing process. For causing the lubricant according to this invention to adhere to synthetic fibers, known prior art lubricating methods may be used such as the roller oiling method, the guide oiling method and the spray oiling method.

Examples of synthetic fibers to which the lubricants according to this invention can be applied include polyamide filaments, polyester filaments, polyacrylonitrile filaments and polyolefin filaments but it is preferred to apply them to polyamide or polyester filaments. It is particularly preferable to make the application to polyamide or polyester fibers to be used for industrial purposes adapted to undergo a spinning process under a high temperature and high contact pressure condition.

Several preferred examples of lubricant will be described next as follows:

(1) Lubricant (T-1) comprising polyether polyester nitrogenous compound (P-1) of numerically averaged molecular weight 1500 obtained by forming polyalkoxylated block on hydroxyl group of distearyl monoethanolamine and then forming polycarbonylpentoxy block on end hydroxyl group of this polyalkoxylated block, the polyalkoxylated block having 10 ethoxy units for each hydroxyl group of distearyl monoethanolamine, the ratio of (the number of ethoxy units forming the polyalkoxylated block)/(the number of carbonylpentoxy units forming the polycarbonylpentoxy block)=2/1;

(2) Lubricant (T-2) comprising polyether polyester nitrogenous compound (P-2) of numerically averaged molecular weight 10000 obtained by forming polyalkoxylated block on each hydroxyl group of lauryl diethanolamine and then forming polycarbonylpentoxy block on each end hydroxyl group of this polyalkoxylated block, the polyalkoxylated block having 60 alkoxy units (with molar ratio (ethoxy units)/(propoxy units)=50/10) for each hydroxyl group of lauryl diethanolamine, the ratio of (the number of alkoxy units forming the polyalkoxylated block)/(the number of carbonylpentoxy units forming the polycarbonylpentoxy block)=3/1;

(3) Lubricant (T-3) comprising polyether polyester nitrogenous compound (P-3) of numerically averaged molecular weight 3300 obtained by forming polyalkoxylated block on hydroxyl group of stearic monoethanolamide and then forming polycarbonylpentoxy block on end hydroxyl group of this polyalkoxylated block, the polyalkoxylated block having 30 ethoxy units for each hydroxyl group of stearic monoethanolamide, the ratio of (the number of ethoxy units forming the polyalkoxylated block)/(the number of carbonylpentoxy units forming the polycarbonylpentoxy block)=2/1;

(4) Lubricant (T-4) comprising polyether polyester nitrogenous compound (P-4) of numerically averaged molecular weight 3400 obtained by forming polyalkoxylated block on each hydroxyl group of oleic diethanolamide and then forming polycarbonylpentoxy block on each end hydroxyl group of this polyalkoxylated block, the polyalkoxylated block having 10 ethoxy units for each hydroxyl group of oleic diethanolamide, the ratio of (the number of ethoxy units forming the polyalkoxylated block)/(the number of carbonylpentoxy units forming the polycarbonylpentoxy block)=1/1;

(5) Lubricant (T-5) comprising polyether polyester nitrogenous compound (P-5) of numerically averaged molecular weight 4300 obtained by forming polyalkoxylated block on each hydroxyl group of 12-hydroxystearic monoethanolamide and then forming polycarbonylpentoxy block on each end hydroxyl group of this polyalkoxylated block, the polyalkoxylated block having 20 ethoxy units for each hydroxyl group of 12-hydroxystearic monoethanolamidea the ratio of (the number of ethoxy units forming the polyalkoxylated block)/(the number of carbonylpentoxy units forming the polycarbonylpentoxy block)=2/1;

(6) Lubricant (T-6) comprising polyether polyester nitrogenous compound (P-6) of numerically averaged molecular weight 6200 obtained by forming polyalkoxylated block on each hydroxyl group of 12-hydroxystearic diethanolamide and then forming polycarbonylpentoxy block on each end hydroxyl group of this polyalkoxylated block, the polyalkoxylated block having 20 ethoxy units for each hydroxyl group of 12-hydroxystearic diethanolamidee the ratio of (the number of ethoxy units forming the polyalkoxylated block)/(the number of carbonylpentoxy units forming the polycarbonylpentoxy block)=1/1;

(7) Lubricant (T-7) comprising acylated polyether polyester nitrogenous compound (P-7) of numerically averaged molecular weight 1700 obtained by acylating end hydroxyl group of polycarbonylpentoxy block of aforementioned polyether polyester nitrogenous compound (P-1) by stearoyl chloride;

(8) Lubricant (T-8) comprising acylated polyether polyester nitrogenous compound (P-8) of numerically averaged molecular weight 3500 obtained by acylating end hydroxyl group of polycarbonylpentoxy block of aforementioned polyether polyester nitrogenous compound (P-3) by oleoroyl chloride;

(9) Lubricant (T-9) comprising acylated polyether polyester nitrogenous compound (P-9) of numerically averaged molecular weight 4700 obtained by acylating end hydroxyl group of polycarbonylpentoxy block of aforementioned polyether polyester nitrogenous compound (P-5) by stearoyl chloride;

(10) Lubricant (T-10) comprising 30 weight parts of aforementioned polyether polyester nitrogenous compound (P-1) and 70 weight parts of dioleyl adipate;

(11) Lubricant (T-11) comprising 20 weight parts of aforementioned polyether polyester nitrogenous compound (P-3) and 80 weight parts of isopentacosyl oleate;

(12) Lubricant (T-12) comprising 10 weight parts of aforementioned polyether polyester nitrogenous compound (P-5) and 90 weight parts of 1,6-hexanediol dioleate;

(13) Lubricant (T-13) comprising 30 weight parts of aforementioned acylated polyether polyester nitrogenous compound (P-7) and 70 weight parts of dioleyl adipate;

(14) Lubricant (T-14) comprising 20 weight parts of aforementioned acylated polyether polyester nitrogenous compound (P-8) and 80 weight parts of isopentacosyl oleate; and

(15) Lubricant (T-15) comprising 10 weight parts of aforementioned polyether polyester nitrogenous compound (P-9) and 90 weight parts of 1,6-hexanediol dioleate.

Preferred methods according to this invention of lubricating synthetic fibers include heating a lubricant according to any of (1)–(15) described above to 60° C. to make it a uniform liquid and applying it directly in the neat condition by the guide oiling method onto polyester filaments immediately after the spinning process at the ratio of 0.8–1.8 weight %.

The invention is described next by way of test examples for actual applications but these examples are not intended to limit the scope of the invention. Throughout hereafter, "parts" will mean "weight parts" and "%" will mean "weight %".

Test Part No. 1
(Synthesis of (Acylated) Polyether Polyester Nitrogenous Compounds)
Synthesis of Polyether Polyester Nitrogenous Compound (P-1)

Distearyl monoethanolamine 565 g (1 mole) and potassium hydroxide 2 g were placed in an autoclave and after it was purged with nitrogen gas, ethylene oxide 440 g (10 moles) was pressured inside while the temperature was maintained at 120–140° C. After one houres maturation reaction, the catalyst was removed to obtain a reaction product which was a polyether nitrogenous compound with numerically averaged molecular weight 990 (by GPC method, converted to polystyrene, throughout herein) having polyalkoxylated block formed at the hydroxyl group of distearyl monoethanolamine, the polyalkoxylated block having 10 ethoxy units per hydroxyl group of the distearyl monoethanolamine (by NMR method of analysis throughout herein). Next, this polyether nitrogenous compound 198 g (0.2 moles) and tetrabutoxy titanate 1 g were placed inside a flask and heated to 150° C. with stirring in the presence of a nitrogen gas flow. While the temperature was maintained at 140–150° C., $\epsilon$-caprolactone 114 g (1 mole) was dropped in over a period of 20 minutes. After the titration was finished, the reaction was continued for 3 hours at 150° C. until it was completed to obtain a reaction product. This reaction product was polyether polyester nitrogenous compound (P-1) with numerically averaged molecular weight 1500, having polycarbonylpentoxy block formed in end hydroxyl group of the polyalkoxylated block of the polyether nitrogenous compound, this polyalkoxylated block having 10 ethoxy groups per hydroxyl group of the distearyl monoethanolamine, and the ratio of (the number of ethoxy groups forming the polyalkoxylated block)/(the number of carbonylpentoxy unit forming the polycarbonylpentoxy block) being 2/1.

Synthesis of Polyether Polyester Nitrogenous Compounds (P-2), (R-1), (R-2) and (R-7)–(R-10)

Polyether polyester nitrogenous compounds (P-2), (R-1), (R-2) and (R-7)–(R-10) were obtained similarly as described above for the synthesis of polyether polyester nitrogenous compound (P-1).

Synthesis of Polyether Polyester Nitrogenous Compound (P-3)

Stearic monoethanolamide 327 g (1 mole) and potassium hydroxide 4 g were placed in an autoclave and after it was purged with nitrogen gas, ethylene oxide 1320 g (30 moles) was pressured inside while the temperature was maintained at 120–140° C. After one hour's maturation reaction, the catalyst was removed to obtain a reaction product which was a polyether nitrogenous compound with numerically averaged molecular weight 1600 having polyalkoxylated block formed at the hydroxyl group of stearic monoethanolamide, the polyalkoxylated block having 30 ethoxy units per hydroxyl group of the stearic monoethanolamide. Next, this polyether nitrogenous compound 320 g (0.2 moles) and tetrabutoxy titanate 3 g were placed inside a flask and heated to 150° C. with stirring in the presence of a nitrogen gas flow. While the temperature was maintained at 140–150° C., $\epsilon$-caprolactone 342 g (3 moles) was dropped in over a period of 20 minutes. After the titration was finished, the reaction was continued for 3 hours at 150° C. until it was completed to obtain a reaction product. This reaction product was polyether polyester nitrogenous compound (P-3) with numerically averaged molecular weight 3300, having polycarbonylpentoxy block formed in end hydroxyl group of the polyalkoxylated block of the polyether nitrogenous compound, this polyalkoxylated block having 30 ethoxy groups per hydroxyl group of the stearic monoethanolamide, and the ratio of (the number of ethoxy groups forming the polyalkoxylated block)/(the number of carbonylpentoxy unit forming the polycarbonylpentoxy block) being 2/1.

Synthesis of Polyether Polyester Nitrogenous Compounds (P-4), and (R-3)–(R-6)

Polyether polyester nitrogenous compounds (P-4), and (R-3)–(R-6) were obtained similarly as described above for the synthesis of polyether polyester nitrogenous compound (P-3).

Synthesis of Polyether Polyester Nitrogenous Compound (P-5)

12-hydroxystearic monoethanolamide 343 g (1 mole) and potassium hydroxide 5 g were placed in an autoclave and after it was purged with nitrogen gas, ethylene oxide 1760 g (40 moles) was pressured inside while the temperature was maintained at 120–140° C. After one hours maturation reaction, the catalyst was removed to obtain a reaction product which was a polyether nitrogenous compound with numerically averaged molecular weight 2100 having polyalkoxylated block formed at each hydroxyl group of 12-hydrostearic monoethanolamide, the polyalkoxylated block having 20 ethoxy units per hydroxyl group of the 12-hydrostearic monoethanolamide. Next, this polyether nitrogenous compound 420 g (0.2 moles) and tetrabutoxy titanate 4 g were placed inside a flask and heated to 150° C. with stirring in the presence of a nitrogen gas flow. While the temperature was maintained at 140–150° C., $\epsilon$-caprolactone 456 g (4 moles) was dropped in over a period of 20 minutes. After the titration was finished, the reaction was continued for 3 hours at 150° C. until it was completed to obtain a reaction product This reaction product was polyether polyester nitrogenous compound (P-5) with numerically averaged molecular weight 4300, having polycarbonylpentoxy block formed in each end hydroxyl group of the polyalkoxylated block of the polyether nitrogenous compound, this polyalkoxylated block having 20 ethoxy groups per hydroxyl group of the 12-hydrostearic monoethanolamide, and the ratio of (the number of ethoxy groups forming the polyalkoxylated block)/(the number of carbonylpentoxy unit forming the polycarbonylpentoxy block) being 2/1.

Synthesis of Polyether Polyester Nitrogenous Compounds (P-6) and (R-11)

Polyether polyester nitrogenous compounds (P-6) and (R-11) were obtained similarly as described above for the synthesis of polyether polyester nitrogenous compound (P-5).

Details of these polyester polyester nitrogenous compounds thus obtained are summarized below in Table 1.

Synthesis of Acylated Polyether Polyester Nitrogenous Compound (P-7)

Aforementioned polyether polyester nitrogenous compound (P-1) 150 g (0.1 mole) and triethylamine 12 g (0.12 moles) were added to toluene 300 ml, heated and dissolved. Stearoyl chloride 33 g (0.11 moles) was gradually added to this solution for a reaction and the reaction was completed by keeping the reacting system at 50–60° C. for two hours. After the reaction was over, the deposited triethylamine chloride was filtered and a synthesized material was obtained by distilling away toluene from the filtered liquid under a reduced pressure condition. The material thus obtained was acylated polyether polyester nitrogenous compound (P-7) with numerically averaged molecular weight 1700 having end hydroxyl group of the polycarbonylpentoxy block of polyether polyester nitrogenous compound (P-1) acylated by stearoyl chloride.

Synthesis of Acylated Polyether Polyester nitrogenous compounds (P-8) and (P-9)

Acylated polyether polyester nitrogenous compounds (P-8) and (P-9) were obtained similarly as described above for the synthesis of acylated polyether polyester nitrogenous compound (P-7).

Details of these acylated polyester polyester nitrogenous compounds thus obtained are summarized below in Table 2.

TABLE 1

| Polyether polyester nitrogenous compound Kind | Fatty alkanol nitrogenous compound Kind/ Number of OH-groups | Polyether block Alkoxy units Kind/ Number (AO) | Polyester block Number of carbonyl-pentoxy units (PC) | Ratio (AO)/ (PC) | Numerically averaged molecular weight |
|---|---|---|---|---|---|
| P-1 | AM-1/1 | EO/10 | 5 | 2/1 | 1500 |
| P-2 | AM-2/2 | EO/50 PO/10 | 20 | 3/1 | 10000 |
| P-3 | AD-1/1 | EO/30 | 15 | 2/1 | 3300 |
| P-4 | AD-2/2 | EO/10 | 10 | 1/1 | 3400 |
| P-5 | AH-1/2 | EO/20 | 10 | 2/1 | 4300 |
| P-6 | AH-2/3 | EO/20 | 20 | 1/1 | 6200 |
| R-1 | am-1/1 | EO/10 | 5 | 2/1 | 1200 |
| R-2 | am-2/2 | EO/10 | 5 | 2/1 | 2200 |
| R-3 | ad-1/1 | EO/30 | 15 | 2/1 | 3100 |
| R-4 | ad-2/2 | EO/10 | 10 | 1/1 | 3200 |
| R-5 | ah-1/2 | EO/20 | 10 | 2/1 | 4000 |
| R-6 | ah-2/3 | EO/20 | 20 | 1/1 | 6000 |
| R-7 | AM-1/1 | EO/2 | 2 | 1/1 | 600 |
| R-8 | AM-1/1 | EO/120 | 40 | 3/1 | 9800 |
| R-9 | AM-1/1 | EO/60 | 120 | 1/2 | 16000 |
| R-10 | AM-1/1 | EO/10 | 1 | 10/1 | 800 |
| R-11 | AH-2/3 | EO/70 | 70 | 1/1 | 31800 |

In Table 1:
AM-1: Distearyl monoethanolamine
AM-2: Lauryl diethanolamine
AD-1: Stearic monoethanolamide
AD-2: Oleic diethanolamide
AH-1: 12-hydroxystearic monoethanolamide
AH-2: 12-hydroxystearic diethanolamide
am-1: Caprylmethyl monoethanolamine
am-2: Capryl diethanolamine
ad-1: Caproic monoethanolamide
ad-2: Caproic diethanolamide
ah-1: Lactic monoethanolamide
ah-2: Lactic diethanolamide

TABLE 2

| Acylated polyether polyester nitrogenous compound Kind | Fatty alkanol nitrogenous compound Kind/ Number of OH-groups | Polyether block Alkoxy units Kind/ Number (AO) | Polyester block Number of carbonyl-pentoxy units (PC) | Ratio (AO)/ (PC) | End acyl group of polyester block Kind/ Number | Numerically averaged molecular weight |
|---|---|---|---|---|---|---|
| P-7 | AM-1/1 | EO/10 | 5 | 2/1 | AC-1/1 | 1700 |
| P-8 | AD-1/1 | EO/30 | 15 | 2/1 | AC-2/1 | 3500 |
| P-9 | AH-1/2 | EO/20 | 10 | 2/1 | AC-1/2 | 4700 |

In Table 2:
AC-1: Stearoyl group
AC-2: Oleoroyl group

TEST PART NO. 2
(Preparation of Lubricants)

Preparation of Lubricants (T-1)–(T-9) and (t-1)–(t-11)

Polyether polyester nitrogenous compounds and acylated polyether polyester nitrogenous compounds obtained in Test Part No. 1 were used as lubricants as they were.

Preparation of lubricant (T-10)

Lubricant (T-10) was prepared by mixing 30 parts of polyether polyester nitrogenous compound (P-1) obtained in Test Part No. 1 and 70 parts of isopentacosyl oleate (E-1) at 70–80° C. until they became uniform.

Preparation of Lubricants (T-11)–(T-15)

Lubricants (T-11)–(T-15) were similarly prepared as described above for the synthesis of lubricant (T-10).

Details of these lubricants thus obtained are summarized below in Table 2.

TEST PART NO. 3
(Application of Lubricants to Synthetic Fibers and Evaluations)

Application of Lubricants to Synthetic Fibers

Chips of polyethylene terephthalate with intrinsic viscosity 1.10 and density of carboxyl end group equivalent $15/10^6$ g were melted and fibers were produced by means of an extruder equipped with a spinneret with 500 holes. After each of the lubricants shown in Tables 3 and 4 was heated to 60° C. and applied by the guide oiling method by the use of a measuring pump on the fibers from the spinneret these fibers having the lubricant attached thereon were collected by means of a guiding means. After they were pulled by a draft roll with surface velocity of 3500 m/minute, they were drawn through a first drawing roll, a second drawing roll, a third drawing roll and a relaxing roll such that the total draw ratio would be 1.7. The fineness of the fibers after passing over the relaxing roll was 1500 denier. They were then wound up in the form of a wound cheese of 10 kg to obtain processed synthetic fibers.

Measurement

The amount of each lubricant attached to the fibers was measured according to JIS-L1073 (Test method of synthetic fiber filaments) by using a mixed solvent of (normal hexane)/(ethanol)=50/50 (in volume ratio) as extraction solvent. The results are shown in Tables 3 and 4.

Evaluations of Yarn Breakages

The number of yarn breakages per ton of the synthetic fibers was measured and the measured values were evaluated according to the following standard:

A: Yarn breakages less than 0.5 times
B-A: Yarn breakages between 0.5 and 10 times
B: Yarn breakages between 0.1 and 1.5 times
C: Yarn breakages between 1.5 and 2.0 times
D: Yarn breakages over 2.0 times The results are shown in Tables 3 and 4.

Evaluations of Generation of Fuzz

The number of surface fuzz of 100 cheeses of the 10 kg wound cheese of the processed synthetic fibers and the measured numbers were evaluated according to the following standard:

A: Less than 50
B-A: Between 50 and 200
B: Between 200 and 500
C: Between 500 and 1000
D: Over 1000

The results are shown in Tables 3 and 4.

It has been clearly shown that this invention makes it possible to provide lubricity even to synthetic fibers produced under a condition of high temperature and high contact pressure and to obtain synthetic fibers which do not generate fuzz or cause yarn breakages even during their spinning process.

TABLE 3

| | Lubricant composition | | | | Evaluation | |
|---|---|---|---|---|---|---|
| | (Acylated) polyether polyester nitrogenous compound | Aliphatic acid ester | Weight ratio: (polyether polyester nitrogenous compound)/ (aliphatic acid ester) | Attached amount (%) | Yarn breakage | Fuzz |
| Kind | Kind/Amount (%) | Kind/Amount (%) | | | | |
| T-1 | P-1/100 | —/— | 100/0 | 0.8 | B | B-A |
| T-2 | p-2/100 | —/— | 100/0 | 1.0 | B | B |
| T-3 | P-3/100 | —/— | 100/0 | 1.5 | A | B-A |
| T-4 | P-4/100 | —/— | 100/0 | 1.5 | B-A | B-A |
| T-5 | P-5/100 | —/— | 100/0 | 1.0 | A | B-A |
| T-6 | P-6/100 | —/— | 100/0 | 1.0 | B-A | B-A |
| T-7 | P-7/100 | —/— | 100/0 | 1.0 | B | B-A |
| T-8 | P-8/100 | —/— | 100/0 | 1.8 | A | B-A |
| T-9 | P-9/100 | —/— | 100/0 | 0.8 | A | B-A |
| T-10 | P-1/30 | E-1/70 | 30/70 | 1.0 | B-A | B-A |
| T-11 | P-3/20 | E-2/80 | 20/80 | 1.0 | A | A |
| T-12 | P-5/10 | E-3/90 | 10/90 | 1.0 | A | A |
| T-13 | P-7/30 | E-1/70 | 30/70 | 1.0 | B-A | B-A |
| T-14 | P-8/20 | E-2/80 | 20/80 | 1.0 | A | A |
| T-15 | P-9/10 | E-3/90 | 10/90 | 1.0 | A | A |

In Table 3:
E-1: Dioleyl adipate
E-2: Isopentacosyl oleate
E-3: 1,6-hexanediol dioleate

TABLE 4

| | Lubricant composition | | | Weight ratio: (polyether polyester nitrogenous compound)/ (aliphatic acid ester) | Evaluation | |
|---|---|---|---|---|---|---|
| | Polyether polyester nitrogenous compound | Aliphatic acid ester | Others | | | |
| Kind | Kind/Amount (part) | Kind/Amount (part) | Kind/Amount (part) | | Attached amount (%) | Yarn breakage | Fuzz |
| t-1 | R-1/100 | —/— | —/— | 100/0 | 1.0 | D | C |
| t-2 | R-2/100 | —/— | —/— | 100/0 | 1.0 | D | C |
| t-3 | R-3/100 | —/— | —/— | 100/0 | 1.0 | D | D |
| t-4 | R-4/100 | —/— | —/— | 100/0 | 1.0 | D | C |
| t-5 | R-5/100 | —/— | —/— | 100/0 | 1.0 | D | C |
| t-6 | R-6/100 | —/— | —/— | 100/0 | 1.0 | D | D |
| t-7 | R-7/100 | —/— | —/— | 100/0 | 1.0 | D | C |
| t-8 | R-8/100 | —/— | —/— | 100/0 | 1.0 | D | D |
| t-9 | R-9/100 | —/— | —/— | 100/0 | 1.0 | D | C |
| t-10 | R-10/100 | —/— | —/— | 100/0 | 1.0 | D | C |
| t-11 | R-11/100 | —/— | —/— | 100/0 | 1.0 | D | D |
| t-12 | —/— | —/— | r-1/100 | — | 1.0 | D | D |
| t-13 | —/— | —/— | r-2/100 | — | 1.0 | D | D |
| t-14 | —/— | —/— | r-3/100 | — | 1.0 | D | D |
| t-15 | —/— | —/— | r-4/100 | — | 1.0 | D | D |
| t-16 | —/— | —/— | r-5/100 | — | 1.0 | D | D |

In Table 4:
r-1: Polyether polyester block copolymer with numerically averaged molecular weight 3000 obtained by ring-opening polymerization of 30 moles of ethylene oxide to 1 mole of triethanolamine and further ring-opening polymerization of 15 moles of ε-caprolactone;
r-2: Polyether polyester block copolymer with numerically averaged molecular weight 3000 obtained by ring-opening polymerization of 20 moles of ethylene oxide to 1 mole of ethylene diamine and further ring-opening polymerization of 20 moles of ε-caprolactone;
r-3: Mixture of 33 parts of polyester of numerically averaged molecular weight 6000 obtained by condensation polymerization of (polyoxylated (ethoxy unit number = 25) hydrogenated castor oil)/(adipic acid)/(dotriacontanoic acid) = 2/1/2 (in molar ratio) and 67 parts of polyoxylated (ethoxy unit number = 25) hydrogenated castor oil;

TABLE 4-continued

| | Lubricant composition | | | Weight ratio: (polyether polyester nitrogenous compound)/ (aliphatic acid ester) | Evaluation | | |
|---|---|---|---|---|---|---|---|
| | Polyether polyester nitrogenous compound | Aliphatic acid ester | Others | | | | |
| Kind | Kind/ Amount (part) | Kind/ Amount (part) | Kind/ Amount (part) | Attached amount (%) | Yarn break-age | Fuzz | | r-4: Mixture of 23 parts of polymer of numerically averaged molecular weight 6000 obtained by condensation polymerization of (polyoxylated (ethoxy molar ratio) and 77 parts of polyoxylated (ethoxy unit number = 25) hydrogenated castor oil;
r-5: Mixture of 23 parts of polyether copolymer of numerically averaged molecular weight 8000 and molar ratio PO/EO = 25/75 and 77 parts of polyoxylated (ethoxy unit number = 25) hydrogenated castor oil.

What is claimed is:

1. A lubricant for synthetic fibers, said lubricant comprising a polyether polyester nitrogenous compound with numerically averaged molecular weight 500–20000 obtained by ring-opening polymerization of hydroxyl group of fatty alkanol nitrogenous compound of a specified kind with alkylene oxide with 2–4 carbon atoms to form polyalkoxylated block and ring-opening polymerization of end hydroxyl group of said polyalkoxylated block with ε-caprolactone to form polycarbonylpentoxy block, said polyalkoxylated block having 4–100 alkoxy units per hydroxyl group of said fatty alkanol nitrogenous compound, the number of alkoxy units of said polyalkoxylated block and the number of carbonyl pentoxy units of said polycarbonylpentoxy block being at a ratio of 1/1–6/1, said fatty alkanol nitrogenous compound of the specified kind being one or more selected from the group consisting of dialkyl monoalkanolamine having alkyl group with 8–24 carbon atoms, alkyl dialkanolamine having alkyl group with 8–24 carbon atoms, fatty acidic monoalkanolamnide of fatty acid with 8–24 carbon atoms, fatty acidic dialkanolamide of fatty acid with 8–24 carbon atoms, hydroxy fatty acidic monoalkanolamide of hydroxy fatty acid with 6–24 carbon atoms and hydroxy fatty acidic dialkanolaride of hydroxy fatty acid with 6–24 carbon atoms.

2. The lubricant of claim 1 wherein said fatty alkanol nitrogenous compound is one or more selected from the group consisting of fatty acidic monoalkanolamide of fatty acid with 16–22 carbon atoms and hydroxy fatty acidic monoalkanolamide of hydroxy fatty acid with 16–22 carbon atoms.

3. The lubricant of claim 1 further comprising aliphatic ester which is one or more selected from the group consisting of esters derived from oleic acid and esters derived from oleyl alcohol at a weight ratio of 50/50–95/5 with respect to said polyether polyester nitrogenous compound.

4. The lubricant of claim 2 further comprising aliphatic ester which is one or more selected from the group consisting of esters derived from oleic acid and esters derived from oleyl alcohol at a weight ratio of 50/50–95/5 with respect to said polyether polyester nitrogenous compound.

5. A lubricant for synthetic fibers, said lubricant comprising acylated polyether polyester nitrogenous compound obtained by reacting an acylation reagent with 2–22 carbon atoms with end hydroxyl group of polyester block of a polyether polyester nitrogenous compound, said polyether polyester nitrogenous compound having numerically averaged molecular weight 500–20000 and being obtained by ring-opening polymerization of hydroxyl group of fatty alkanol nitrogenous compound of a specified kind with alkylene oxide with 2–4 carbon atoms to form polyalkoxylated block and ring-opening polymerization of end hydroxyl group of said polyalkoxylated block with ε-caprolactone to form polycarbonylpentoxy block, said polyalkoxylated block having 4–100 alkoxy units per hydroxyl group of said fatty alkanol nitrogenous compound, the number of alkoxy units of said polyalkoxylated block and the number of carbonyl pentoxy units of said polycarbonylpentoxy block being at a ratio of 1/1–6/1, said fatty alkanol nitrogenous compound of the specified kind being one or more selected from the group consisting of dialkyl monoalkanolamine having alkyl group with 8–24 carbon atoms, alkyl dialkanolamine having alkyl group with 8–24 carbon atoms, fatty acidic monoalkanolamide of fatty acid with 8–24 carbon atoms, fatty acidic dialkanolamide of fatty acid with 8–24 carbon atoms, hydroxy fatty acidic monoalkanolamide of hydroxy fatty acid with 6–24 carbon atoms and hydroxy fatty acidic dialkanolamide of hydroxy fatty acid with 6–24 carbon atoms.

6. The lubricant of claim 5 further comprising aliphatic ester which is one or more selected from the group consisting of esters derived from oleic acid and esters derived from oleyl alcohol at a weight ratio of 50/50–95/5 with respect to said acylated polyether polyester nitrogen compound.

7. A method of processing synthetic fibers comprising the steps of heating a lubricant to 40–80° C. and attaching said heated lubricant to said synthetic fibers in a neat condition between spinning process and drawing process at a rate of 0.1–3 weight % with respect to said synthetic fibers, said lubricant comprising a polyether polyester nitrogenous compound with numerically averaged molecular weight 500–20000 obtained by ring-opening polymerization of hydroxyl group of fatty alkanol nitrogenous compound of a specified kind with alkylene oxide with 2–4 carbon atoms to form polyalkoxylated block and ring-opening polymerization of end hydroxyl group of said polyalkoxylated block with ε-caprolactone to form polycarbonylpentoxy block, said polyalkoxylated block having 4–100 alkoxy units per hydroxyl group of said fatty alkanol nitrogen compound, the number of alkoxy units of said polyalkoxylated block and the number of carbonyl pentoxy units of said polycarbonylpentoxy block being at a ratio of 1/1–6/1, said fatty alkanol nitrogenous compound of the specified kind being one or more selected from the group consisting of dialkyl monoalkanolamine having alkyl group with 8–24 carbon atoms, alkyl dialkanolamine having alkyl group with 8–24 carbon atoms, fatty acidic monoalkanolamide of fatty acid with 8–24 carbon atoms, fatty acidic dialkanolamide of fatty acid with 8–24 carbon atoms, hydroxy fatty acidic monoalkanolamide of hydroxy fatty acid with 6–24 carbon atoms and hydroxy fatty acidic dialkanolamide of hydroxy fatty acid with 6–24 carbon atoms.

8. The method of claim 7 wherein said fatty alkanol nitrogen compound is one or more selected from the group consisting of fatty acidic monoalkanolamide of fatty acid with 16–22 carbon atoms and hydroxy fatty acidic monoalkanolamide of hydroxy fatty acid with 16–22 carbon atoms.

9. The method of claim 7 wherein said lubricant further comprises aliphatic ester which is one or more selected from the group consisting of esters derived from oleic acid and esters derived from oleyl alcohol at a weight ratio of 50/50–95/5 with respect to said polyether polyester nitrogenous compound.

10. The method of claim 8 wherein said lubricant further comprises aliphatic ester which is one or more selected from the group consisting of esters derived from oleic acid and esters derived from oleyl alcohol at a weight ratio of 50/50–95/5 with respect to said polyether polyester nitrogenous compound.

11. A method of processing synthetic fibers comprising the steps of heating a lubricant to 40–80° C. and attaching said heated lubricant to said synthetic fibers in a neat condition between spinning process and drawing process at a rate of 0.1–3 weight % with respect to said synthetic fibers, said lubricant comprising acylated polyether polyester nitrogenous compound obtained by reacting an acylation reagent with 2–22 carbon atoms with end hydroxyl group of polyester block of a polyether polyester nitrogenous compound, said polyether polyester nitrogenous compound having numerically averaged molecular weight 500–20000 and being obtained by ring-opening polymerization of hydroxyl group of fatty alkanol nitrogenous compound of a specified kind with alkylene oxide with 2–4 carbon atoms to form polyalkoxylated block and ring-opening polymerization of end hydroxyl group of said polyalkoxylated block with ε-caprolactone to form polycarbonylpentoxy block, said polyalkoxylated block having 4–100 alkoxy units per hydroxyl group of said fatty alkanol nitrogenous compound, the number of alkoxy units of said polyalkoxylated block and the number of carbonyl pentoxy units of said polycarbonylpentoxy block being at a ratio of 1/1–6/1, said fatty alkanol nitrogenous compound of the specified kind being one or more selected from the group consisting of dialkyl monoalkanolamine having alkyl group with 8–24 carbon atoms, alkyl dialkanolamine having alkyl group with 8–24 carbon atoms, fatty acidic monoalkanolamide of fatty acid with 8–24 carbon atoms, fatty acidic dialkanolamide of fatty acid with 8–24 carbon atoms, hydroxy fatty acidic monoalkanolamide of hydroxy fatty acid with 6–24 carbon atoms and hydroxy fatty acidic dialkanolamide of hydroxy fatty acid with 6–24 carbon atoms.

12. The method of claim 11 wherein said lubricant further comprises aliphatic ester which is one or more selected from the group consisting of esters derived from oleic acid and esters derived from oleyl alcohol at a weight ratio of 50/50–95/5 with respect to said acylated polyether polyester nitrogenous compound.

\* \* \* \* \*